Patented Mar. 21, 1950

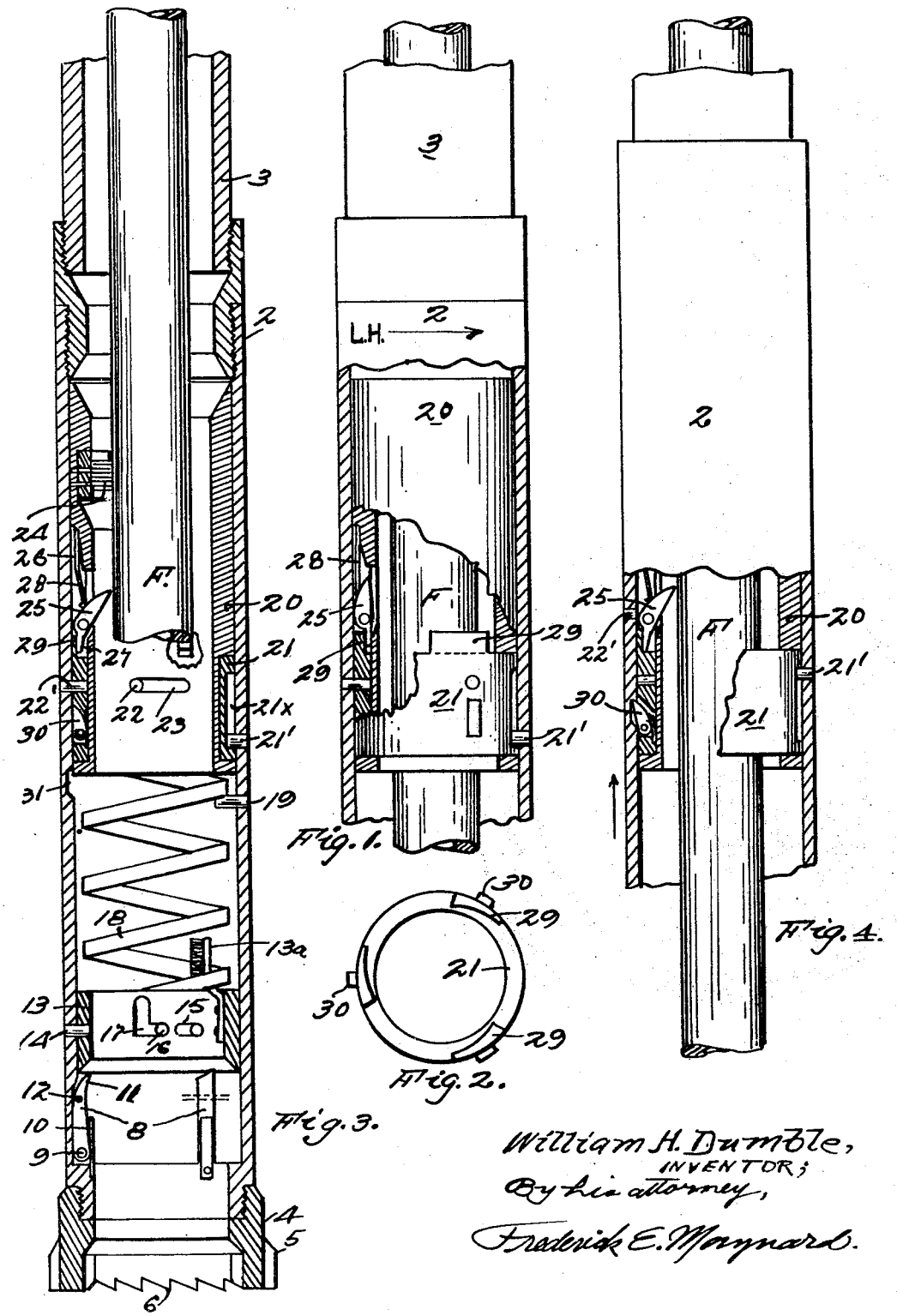

2,501,319

UNITED STATES PATENT OFFICE 2,501,319

WASHOVER, CUTTER, AND FISH REMOVING TOOL

William H. Dumble, Bakersfield, Calif.

Application July 3, 1945, Serial No. 603,013

15 Claims. (Cl. 164—.6)

This invention is a well fish washing, cutting and removing tool for operations in oil or other wells or well holes.

When a part of a well rig operating string becomes lost in the well or hole being drilled or otherwise treated the lost part is called a fish and it is very desirable that as much of the fish or all of it be extracted from the well as is possible. The fish may be jammed in the hole because of many reasons well known in the art and sometimes merely washing over the stuck fish will free it for recovery, and in other cases the fish is so frozen in the hole that it must be cut into one or more parts for extraction. And again ordinary fishing operations and known tools fail to recover much if any of the fish because of inaccessibility or because of the nature of the agent jamming the fish in the hole.

Therefore, one object of this invention is to provide not only for ample washover operations on the fish but additionally to provide, in combination, a means for cutting away external and internal obstructions that may effectively interfere with the successful descent of the fishing tool to the fish.

Another object of the invention is to provide a fishing tool having fish cutting bits which are normally in an ineffective position in a housing structure of the tool and which are thrown into cutting position by means of a positive fish bit or grabbing dog device enabling the use of the tool on either a flush surface fish (a tube or stem or pipe section) or on a fish that may have shoulders along its length, and by means of which dog device certain fish cutters, referred to above as cutting bits, are indirectly set in cutting position of the work or fish.

A further object is to provide an automatic latching device whereby to lock the dog device in a given shifted position in the tool housing to maintain the cutters in their thrown or cutting position even though the dogging device may be made ineffective.

The invention resides in certain advancements in this art as set forth in the ensuing disclosure and having, with the above additional objects and advantages as hereinafter developed, and whose constructions, combinations and sub-combinations, and means and details of means will be made manifest in the following description of the herewith illustrative tool; it being understood that modifications, variations, and adaptations may be resorted to within the scope, spirit and principles of the invention as particularly claimed presently.

Figure 1 is a sectional elevation of a portion of the tool housing showing position of the grabbing dogs in normal or free (from work) position as when the tool is being lowered into a hole. Figure 2 is a top plan of a dog controlling cam sleeve. Figure 3 is a longitudinal section of the tool, in place about a fish part, and showing the dogs in fish grabbing position to effect the setting of the fish cutters. Figure 4 is a sectional detail showing the tool housing as upwardly shifted and positively latched with respect to the dogging means.

The tool incorporates an external housing 2 the upper end of which is suitably attached to the lower end of a string of wash-pipe 3 which not only serves wash water to the imperforate tool assembly but also rotates the housing in either direction as may be desired and later herein set forth.

A feature of this invention is the provision of a combined washover shoe and inner and outer reaming tooth system to greatly expedite the job of getting access to and work clear the entrapped fish F, a part of which is shown in place in the tool. Therefore, a shoe 4 is affixed to the bottom of the housing and has an external set of reaming teeth 5 to bore out a hole larger than the tool diameter, and further the shoe carries an end or milling set of teeth 6 to cut away obstructions at the end of the shoe.

A set of any suitable form of fish or work cutters 8 is disposed in the bore of the foot of the housing 2; the cutters being mounted on pivots 9 at their lower ends and normally pressed outward as by springs 10 and if desired rigidly fixed near their nibs 11 as by sheer pins 12 piercing the housing. Just above the cutters is a wedge ring 13 turnably affixed to the housing by suitable shear pins 14 fitting peripheral slots 15 in and allowing the ring to limitedly rotate. After the pins 14 have been sheared to release the ring so that it may be jammed down on the cutters 8 the ring may be rotated to a degree determined by a stop nog or lug 16 fixed in the housing and projecting into an L-slot 17 in the ring. When the nog passes into the vertical limb of the L-slot then the sleeve is dead locked against rotation in the housing.

Downward pressure on the ring 13 is directly effected by a strong compressible spring 18 engageable with the ring. A feature of this invention is that this spring is normally quite free and uncompressed and is held in open, expanded position by a sheer pin 19, in the housing and engaging an upper coil of the spring to suspend it, if desired clear of the ring 13.

Means is provided and which is positively controlled by the interposed fish F to effect the powerful compression of the spring and thereby the release of the ring from its shear pin or pins 14. This means incorporates an elongate, hollow cylinder 20 open throughout its length for water flow and ending at the upper end of the spring and adapted to directly drive down thereon. Countersunk in and turnable on the cylinder is a short sleeve 21 fixed to the cylinder against axial shift by pins 22 fitting peripheral slots 23 allowing limited rotation of the sleeve in the cylinder 20 while this is frictionally held by a brush or other suitable device 24 snugly bearing on the interposed fish; the sleeve being turned to the right, in normal operations, by rotation of the wash pipe 3 carrying the housing 2, as when driving down and rotating the shoe reamer.

Shear pins 22' rigidly fasten the sleeve 21 to the housing.

For the purpose of shearing all of the shear pins aforementioned a set of pivoted and inwardly tiltable fish grabbing or biting dogs 25 is mounted in respective slots 26 in the wall of the cylinder and the lower ends of the dogs have toes 27 which in idle position are pressed out, by springs 28, to rest on the inner faces of relative, horizontal wedge cams 29 provided rigidly on the upper end of the sleeve 21.

After the tool has been worked down to and over the potential fish F to the desired or possible extent severance of the fish can be accomplished by tilting in and rotating the cutters 8. This is done by rotating the housing and the pinned cam sleeve 21 to the left for the purpose of releasing the dogs by the wedge cams 29 so that the dogs will be tilted in by their springs until the dogs bite into the fish; the dog carrying cylinder being frictionally held against rotation about the fish by the brush 24. The next step is to pull on the tool string and the tool and as this shifts upward as to the dogged cylinder this will first shear the sleeve pins 22', and next will shear the spring pin 19. Additional upward shift of the housing 2 compresses the main spring 18 and finally its pressure overcomes shear pins 14 and the wedge ring 13 shifts down and tilts the fish cutters in against the fish.

The L-slot 17 in the ring 16 allows this latter to be locked to the housing 2 as the nog 16 rises in the vertical limb of this slot and then the ring will be locked to and rotate in either direction with the housing and still hold the cutters in effective position.

Means are provided to automatically and positively lock the main spring 18 in its cutter pressing position after the spring has been compressed and whilst the barrel may be raised along the struck fish. The lock means includes a suitable number of out-pressed spring latches 30 mounted in the sleeve 21 which are adapted to snap out into respective keeper slots 31 in the bore wall of the housing 2; as shown in Fig. 4. The locked cylinder still permits the housing to be rotated at will to the left or right as limited by the stop pin 22 so that the wedge cams 29 can open the dogs from the fish and allow the tool to be shifted up whilst the cutters are still compressed.

After severance of the engaged fish the upper cut off part is sustained by the cutters as the tool and fish part are pulled from the well or hole.

The sleeve 21 has limited axial shift in the housing 2 by way of a housing spline pin 21' working in a longitudinal slot 21x in the near face of the sleeve. The wedge ring 13 has a brush or spring arm 13a to frictionally hold onto the fish F while the pins 16 shift in the slots in said ring.

For washover purposes the tool is repeatedly shifted up along the fish and past collars or shoulders thereof so that additional drill pipe lengths may be coupled in the string as the hole is opened around the fish, since until the cutters 8 are finally set on the fish the tool is free for upward shift. The dogs 25 do not have to be set in until all washing is done.

What is claimed is:

1. A tool for cutting off deep well fish, including a housing attachable to a washover pipe string, a set of inwardly tiltable cutters pivotally supported in and on the housing, a wedge ring pinned to the housing, a feed spring engageable with the ring, a pin underhooking the upper end of the spring in expanded position in the housing, and means for shearing the spring pin and subjecting the spring to sufficient pressure to shear the wedge ring pin and free said wedge and therethrough set the cutters for work on the fish.

2. In a well fish cutting tool, a housing having a set of inwardly yieldable fish cutters, a pinned wedge ring to contract the cutters onto an encompassed fish, a normally free and expanded spring and a pin engaging and locking it in expanded position as to the ring, and a housing actuated means for shearing said pin and releasing the spring and compressing it onto the wedge ring.

3. The tool of claim 2; and means for corotatively interlocking the ring to the housing after the ring has been unpinned.

4. A well, fish cutting tool including a housing attachable to a drive string, a set of work engaging, normally inoperative cutters mounted in and on the housing, a wedge ring for the cutters and shear pins rigidly fixing it to the housing, an expanded main spring in the housing and a shear rest pin for its upper end, means in the housing to release the arrested spring from said pin and compress it against the ring and break down its shear pins and actuate the cutters by the released ring, and a locking pin to corotatively connect the unpinned ring to the housing.

5. The tool of claim 4; and means to latch the releasing means in constant spring compressing position following release of the spring.

6. A well, fish cutting tool including a housing, a contractive set of cutters and a contracting ring therefor, means holding the ring out of effect on the cutters, an expanded spring and a device for arresting it in expanded condition above the ring, a cylinder slidable and limitedly rotative in the housing, frictional fish engaging means to restrain the cylinder against rotation with the housing, dogs mounted on the cylinder to bite into the fish on relative upward shift thereof as to the fish, and dog setting means mounted in the housing to effect biting action of the dogs onto the fish; said cylinder operative on relative upward shift of the housing, after the dogs are set, to compress the spring and release the ring to tilt the cutters.

7. The tool of claim 6; and means for locking the cylinder to the housing in spring compressing position.

8. The tool of claim 6; and fastening means normally securing the dog setting means to the housing to be turned therewith as to the cylinder.

9. The tool of claim 6; and shear pins rigidly affixing the dog setting means to the housing to initially turn therewith independent of the cylinder.

10. The tool of claim 6; said setting means including a cam sleeve pinned to the housing and having a cam device to release the dogs for biting action, and a spline slidably connecting the sleeve to the housing for shift after the sleeve pin is sheared.

11. The tool of claim 6; said setting means including a cam sleeve splined to the housing for axial shift and connected to the cylinder for rotation only thereon, relatively, and shear pinned to the housing.

12. The tool of claim 6; said means for setting the dogs including a cam sleeve turnably splined to the cylinder and shear pinned to the housing, a spline connecting the sleeve to the housing for axial shift after the sleeve pin is sheared, and an automatic cylinder latch mounted in the sleeve to interlock with the housing.

13. A fish cutting tool of the class set forth and including a housing having a set of fish biting dogs, and housing carried and operated means whereby to retract the dogs from the biting position on the fish.

14. The tool of claim 13; and automatic means for throwing the dogs into biting position by release of the dogs from the retracted position.

15. The tool of claim 13; the said dogs constantly tending to tilt inward to effective position, and said means including a dog carrying cylinder turnable in the housing and having a device to frictionally engage an interposed fish, and a cam sleeve rotative by the housing for releasing the dogs for inward tilt and for positively retracting the dogs from biting position.

WILLIAM H. DUMBLE.

REFERENCES CITED

The following references are of record in the file of this patent:

UNITED STATES PATENTS

| Number | Name | Date |
|---|---|---|
| 1,277,600 | Kammerer | Sept. 3, 1918 |
| 1,521,596 | Casey | Jan. 6. 1925 |
| 2,054,278 | Wright et al. | Sept. 15, 1936 |
| 2,277,580 | Carrothers | Mar. 24, 1942 |
| 2,398,981 | Waggener | Apr. 23, 1946 |